(12) United States Patent
Hoxmeier

(10) Patent No.: US 6,174,968 B1
(45) Date of Patent: Jan. 16, 2001

(54) OIL GEL FORMULATIONS CONTAINING POLYSILOXANE BLOCK COPOLYMERS DISSOLVED IN HYDROGENATED SILICONE OILS

(75) Inventor: Ronald James Hoxmeier, Houston, TX (US)

(73) Assignee: Shell Oil Company, Houston, TX (US)

(*) Notice: Under 35 U.S.C. 154(b), the term of this patent shall be extended for 0 days.

(21) Appl. No.: 09/379,842

(22) Filed: Aug. 24, 1999

Related U.S. Application Data

(60) Provisional application No. 60/098,744, filed on Sep. 1, 1998.

(51) Int. Cl.[7] .................................................. C08F 283/12
(52) U.S. Cl. ............................. 525/477; 528/16; 528/43; 556/466; 556/467; 556/462
(58) Field of Search ....................... 528/16, 43; 525/477; 556/466, 467, 462

(56) References Cited

U.S. PATENT DOCUMENTS

| | | | |
|---|---|---|---|
| 5,618,903 | * | 4/1997 | Hoxmeier et al. ................. 528/14 |
| 5,670,688 | * | 9/1997 | Dinh et al. ...................... 556/453 |
| 5,693,713 | * | 12/1997 | Hoxmeier et al. ................. 525/102 |

FOREIGN PATENT DOCUMENTS

| | | | |
|---|---|---|---|
| 0568102 A1 | 4/1993 | (EP) | ................ C08L/83/04 |
| 0751170 A2 | 6/1996 | (EP) | ................ C08G/77/26 |
| 61-113646 | 5/1986 | (JP) | ................ A61K/7/00 |
| 01079104 | 3/1989 | (JP) | ................ A61K/7/00 |
| 01079106 | 3/1989 | (JP) | ................ A61K/7/02 |
| 01207354 | 8/1989 | (JP) | ................ C08L/83/05 |
| 01250307 | 10/1989 | (JP) | ................ A61K/7/02 |
| 02088513 | 3/1990 | (JP) | ................ A61K/7/02 |
| 05178734 | 7/1993 | (JP) | ................ A61K/7/48 |

* cited by examiner

*Primary Examiner*—Margaret G. Moore
(74) *Attorney, Agent, or Firm*—Donald F. Haas

(57) ABSTRACT

A silicone oil gel composition which is comprised of a polysiloxane block copolymer which has at least two blocks of polystyrene, polyethylene, and hydrogenated polyisoprene wherein the overall number average molecular weight is from 1000 to 50,000, the polystyrene content is 15% or less by weight, the polystyrene block weight average molecular weight is from 0 to 10,000, the polyethylene block number average molecular weight is from 0 to 10,000, the hydrogenated polyisoprene block number average molecular weight is from 0 to 10,000, the polysiloxane block number average molecular weight is from 1000 to 49,000, wherein the block copolymer is dissolved in a silicone oil which is a hydrogenated silicone oil.

9 Claims, No Drawings

OIL GEL FORMULATIONS CONTAINING POLYSILOXANE BLOCK COPOLYMERS DISSOLVED IN HYDROGENATED SILICONE OILS

This application claims the benefit of U.S. Provisional Application No. 60/098,744, filed Sep. 1, 1998, the entire disclosure of which is hereby incorporated by reference.

FIELD OF THE INVENTION

This invention relates to oil gel compositions for use in cosmetics and pharmaceutical products, cable packing, etc. More particularly, this invention relates to such compositions containing polysiloxane block copolymers and which utilize hydrogenated aromatic group-containing silicone oils.

BACKGROUND OF THE INVENTION

Silicone gel compositions have been used in a variety of products, including sunscreen gels, moisturizing creams, antiperspirant creams, liquid foundations, and hair gels. Known silicone gel compositions include compositions comprised of silicone oil and wax, silicone oil and silica, and silicone oil and polyoxyalkylene-containing organopolysiloxanes, such as described in European Published Patent Application No. 0,568,102. That application identifies a number of possibilities for components useful as the silicone oil including low and high viscosity diorganopolysiloxanes, including polydimethylsiloxane, cyclic siloxanes, cyclic siloxane solutions of polydimethylsiloxane gums, etc.

Linear block copolymers of polystyrene and polydimethylsiloxane have been synthesized, both by graft and block copolymerization. In block copolymerization of such linear polymers, polystyrene is produced by anionic polymerization with an organo lithium initiator and the living polymer (PS—Li+) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block. U.S. Pat. No. 5,618,903 describes a block copolymer which is an anionically polymerized block copolymer which is comprised of at least one block of high density (HDPE) polyethylene and at least one block of a polysiloxane, e.g., polydimethylsiloxane. These polymers are useful for impact modification of engineering thermoplastics, flow promoters, and forming coatings with low energy surfaces but have not been used or suggested for use as components of oil gels.

SUMMARY OF THE INVENTION

This invention is a silicone oil gel composition which is comprised of a polysiloxane, preferably polydimethylsiloxane, block copolymer having at least two of the following types of blocks: polystyrene, polyethylene, and hydrogenated polyisoprene wherein the overall number average molecular weight is from 1000 to 50,000, the polystyrene content (PSC) is 15% or less by weight, the polystyrene block number average molecular weight is from 0 to 10,000, the hydrogenated polyisoprene block number average molecular weight is from 0 to 10,000, and the polyethylene number average block molecular weight is from 0 to 10,000, the polydimethyl-siloxane number average molecular weight is from 1000 to 49,000, wherein the block copolymer is dissolved in a hydrogenated aromatic group-containing silicone oil which is preferably a copolymer of polydimethylsiloxane and polymethylphenylsiloxane with a polydimethylsiloxane content greater than 50% by weight.

DETAILED DESCRIPTION OF THE INVENTION

The polysiloxane block copolymers of this invention and the method of making them are fully described in U.S. Pat. No. 5,618,903, which is herein incorporated by reference. In block copolymerization of linear polystyrene-polydimethylsiloxane polymers, for example, polystyrene is produced by anionic polymerization with an organo lithium initiator and the living polymer (PS—Li+) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block. Such polymers containing polyisoprene blocks are produced by polymerizing isoprene in the same manner as described for styrene.

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Ethylene may be polymerized as described above with the addition that it is usually best to include a promoter, such as a diamine, to facilitate the reaction. Examples of these amines which include but are not limited to follow: N,N,N',N'-tetramethylmethylenediamine (TMMDA), N,N,N',N'-tetramethylethylenediamine (TMEDA), N,N,N',N'-tetraethylethylenediamine (TEEDA), N,N,N',N'-tetramethyl-1,3-propanediamine (TMPDA), N,N,N',N' tetra-methyl-1,4-butanediamine (TMBDA), dipiperidinomethane (DIPIM), 1,2dipiperidinoethane (DIPIE), 1,8-bis (dimethyl-amino) naphthalene, N,N,N',N' tetramethyl-o-phenylene-diamine (TMOPDA), 1,2-dipyrolidinoethane (DIPIP), 1,3-dipiperidinopropane (DIPIP), 1,2-bis (2.6-dimethyl-piperidino) cyclohexane (BDMPC), sparteine, and the like.

The ethylene polymerization reaction can be carried out at 0° C. to 100° C. preferably 25° C. to 60° C. The ethylene pressure can be from 10 psig to 1000 psig, preferably 100 to 500 psig, The polymerization time can run from 10 minutes to 2 hours, preferably 30 minutes to 1 hour.

When the polymerization of the ethylene is complete, living polyethylene blocks are present in the polymerization mixture. These are perfectly linear polyethylene-alkyllithiums. These living polyethylenes can then be reacted isoprene or styrene or with cyclic siloxane monomers $(R_1R_2SiO)_n$, where n=3–10, $R_1$ and $R_2$ =alkyl ($C_1$–$C_{20}$), alkenyl ($C_2$–$C_{20}$), hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_{31}$ $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_{31}$, $(vinylmethylSiO)4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSi)_4$, $(PhMeSiO)_5$. Mixtures of monomers can also be used. When a polydimethylsiloxane block is desired with RLi initiator, the monomer is preferably hexamethylcyclotrisiloxane (D3) or octamethylcyclotetrasiloxane (D4).

This polymerization is carried out in the presence of a polar promoter, including, but not limited to, the promoter present during the ethylene polymerization step. Additional promoter can be added. Such promoters include but are not limited to diethers and/or diamines, such as diethylglyme and/or TMEDA, cyclic ethers such as tetrahydrofuran, and any promoter known to be useful in anionic polymerizations. Its purpose is to decrease the reaction time of the D3 polymerization. Preferably, this reaction is carried out at a temperature of from 30° C. to 120° C., the concentration of the cyclic siloxane monomer (described herein in terms of hexamethylcyclotrisiloxane) is from 1 to 80 percent by weight, and the amount of promoter used ranges from 100 ppm to essentially 100 percent by weight (i.e. the polar promoter is used as solvent). The temperature range is important because higher temperatures cause more rapid reaction. The promoter concentration range is important for the same reason. The reaction may be carried out at up to 80 weight percent solids, preferably 10 to 80 percent. This is advantageous because higher solids offer economic advantages because less solvent is necessary.

The living block copolymer can be recovered directly to give X-PDMS-O-Li+ (where X is a block of polystyrene, polyisoprene, polyethylene, or blocks of each or two of the three; PDMS represents polydimethylsiloxane but other polysiloxanes could also be used instead) which is a living polymer and has not been terminated. One could manufacture and sell the living polymer itself to others that could then react it to form other polymers and/or add other functionalities. Termination of the polymer may be achieved by several conventional means. If desired, the polymer can be capped with $R_3R_4R_5$-SiX, e.g., to give X-PDMS-$SiR_3R_4R_5$, where the R's can be alkyl, alkenyl (C2–$C_{20}$, preferably a vinyl group because of its high reactivity), amino, alcohol, carboxylate, and other hetero atom containing functionalities, phenyl, benzyl, hydrogen, and the like, and can be the same or different, and X is halogen, preferably chlorine, or alkoxide, preferably $C_1$–$C_{20}$. It can be protonated with, e.g., acetic acid, to give X-PDMS-OH. It can also be coupled with, e.g., $SiCl_4$, $Me_2SiCl_2$, $HSi(OMe)_3$ with coupling agent functionalities from 2 to about 12 to give X-PDMS)$_n$, where n=the number of coupling agent functionalities. The coupling or capping reaction can be carried out from 40 to 100° C. for 5 minutes to 1 hour, preferably 70 to 100° C. for about 10 to 15 minutes.

The block copolymers of this invention have an overall number average molecular weight of from 1000 to 50,000, preferably from 1000 to 25,000. If they contain polystyrene, the polysiloxane block copolymers have a PSC of 15% or less, preferably 10% or less, by weight, and the number average molecular weights of the polystyrene blocks vary from 0 to 10,000, preferably 0 to 5000. The polyethylene blocks, if present, have number average molecular weights of from 0 to 10,000, and most preferably from 0 to 5000. The hydrogenated polyisoprene blocks, if present, have number average molecular weights of from 0 to 10,000, and most preferably from 0 to 5000. The number average molecular weights of the polysiloxane blocks vary from 1000 to 49,000, preferably 1000 to 25,000.

The siloxane oil gel compositions of the present invention utilize the above block copolymers as the gelation agent portion of the composition. The oil or solvent portion of the compositions may be comprised of a hydrogenated aromatic group-containing silicone oil. Unhydrogenated aromatic group-containing silicone oils are not suitable for the formation of oil gels with the polymers of this invention. Silicone oils of the following types may be used herein alone or in any combination. All should have a number average molecular weight of 5000 or less and may be terminated with Si–OH, Si–$OCH_3$, or $SiCH_3$:

1) polydimethyldiphenylsiloxane with a polydimethyl content of at least 50 mole %;
2) polydimethylphenylmethylsiloxane with a polydimethyl content of at least 40 mole %;
3) polymethylphenyldiphenylsiloxane with a polymethylphenyl content of at least 40 mole %;
4) polymethylphenylsiloxane homopolymer; and
5) polydiphenylsiloxane homopolymer.

The aromatic group-containing silicone oil is preferably a random copolymer of polydimethylsiloxane and polymethylphenylsiloxane with a polydimethylsiloxane content greater than 50% by weight. The aromatic group-containing silicone oil may have one or a mixture of the structures below:

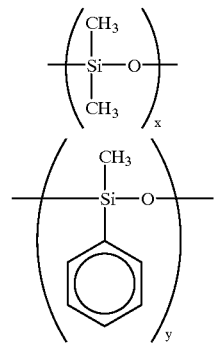

These oils are hydrogenated by subjecting them to hydrogen at 125 to 200° C., preferably 135 to 160° C., and a hydrogen pressure of 1000 to 1700 psi for 30 minutes to 5 hours in the presence of a nickel octanoate/aluminum triethyl catalyst having Al:Ni ratio of 1:1 to 5:1.

The block copolymers are mixed into the oil by dissolving the block copolymer in the hydrogenated silicone oil at 90 to 200° C. for 1 to 2 hours.

The siloxane oil gel compositions of this invention are useful in cosmetic pharmaceutical compositions, cable filling application, etc. These compositions flow very easily at greater than 100° C. and set up (gel) at 25 to 50° C. (or lower). Thus, they are easily recyclable.

EXAMPLES

An aromatic-containing silicone oil which is believed to be a random copolymer of the two structures described above such that the methyl group to phenyl group ratio is 3 to 1 was hydrogenated in a 1 liter autoclave reactor. 500 grams of the silicone oil containing about 25 mole percent phenyl groups was added along with 160 grams of a nickel octonoate/aluminum triethyl hydrogenation catalyst containing 6300 parts per million nickel (wherein the Ni concentration was about 1500 parts per million in the reactor).

The temperature in the reactor was increased from 25° C. and then kept within the range of 130–140° C. for four hours. The pressure in the reactor ranged from 500 to 1750 psi hydrogen. The hydrogenation catalyst residue was extracted with 10 percent by weight acetic acid in water at 70° C. for one hour. The phases were allowed to settle and separate. A second wash step was carried out in the same manner. A third wash step with 6 N NH$_3$ was carried out and the phases were allowed to separate and settle. The volatiles were flashed off at 150° C. in a vacuum oven for six hours. NMR analysis confirmed that more than 90 percent of the aromatic groups in the silicone oil were hydrogenated.

The hydrogenated oil was then used to make oil gels with a variety of polymers by the following procedure. The polymers were dissolved in the oil by heating at 170 to 250° C. for 1 to 3 hours and then cooled to room temperature at which point gelation occurred.

The same method was used in the comparative examples which were carried out with the unhydrogenated oil.

The results of these experiments are shown in tables 1 and 2. Table 1 shows the results of the experiments which were carried out with the unhydrogenated silicone oil. Eight different polymers were used and in no case was a gel created. Table 2 shows the results of experiments done with the hydrogenated silicone oil. Polymers within the scope of the claims of the present invention produced a gel whereas polymers outside the scope of the claims of the present invention did not.

PS indicates a polystyrene block. PDMS is polydimethylsiloxane. PE is polyethylene. PI is polyisoprene. EP is hydrogenated polyisoprene. PDPS is polydiphenylsiloxane. SEBS is a standard hydrogenated styrene-butadiene-styrene block copolymer. PVCH is hydrogenated homopolystyrene or homopolyvinylcyclohexane. Polymer 14 in Table 2 is a 50/50 blend of PVCH and Polymer 1. HPS is homopolystyrene.

TABLE 1

| Polymer | Polymer Type & Description | % Wt | Gel | Polymer Dissolution Conditions (T/t*) |
| --- | --- | --- | --- | --- |
| 1 | PE-EP-PDMS 3K-0.5K-5K | 10% | Insoluble | 200° C./1 hour |
| 2 | PE-PS-PDMS 3K-0.5K-5K | 10% | Insoluble | 200° C./1 hour |
| 3 | PS-PDMS-PS 6K-68K-6K | 10% | Insoluble | 200° C./1 hour |
| 4 | S-EB-S 6K-35K-6K | 10% Total | Insoluble | 200° C./1 hour |
| 5 | S-EB-S 6K-35K-6K | 10% | Insoluble | 200° C./1 hour |
| 6 | PS-PDMS-PS 8.5K-31K-8.5K | 10% | Insoluble | 250° C./1 hour |
| 7 | PS-PDMS 14K-16K | 10% | Insoluble | 250° C./1 hour |
| 8 | HPS (MW-6K) | 5% | Insoluble | 170° C./3 hours |

* T = temperature; t = time

TABLE 2

| Polymer | Polymer Type & Description | % Wt | Gel | Polymer Dissolution Conditions (T/t*) |
| --- | --- | --- | --- | --- |
| 3 | PS-PDMS-PS 6K-68K-6K CE~30% PSC~15% | 10% | No dissolution | 175° C./2 hours |
| 1 | PE-EP-PDMS 3K-0.5K-5K | 5% | Gel-no gravity flow | 175° C./2 hours |
| 9 | PS-EP-PDMS 8K-12K-60K | 5% | No dissolution | 175° C./2 hours |
| 10 | PS-1,4 PBD-PDMS 8K-12K-60K | 5% | No dissolution | 175° C./2 hours |
| 11 | PS-PE-PDMS 8K-12K-60K | 5% | No dissolution | 175° C./2 hours |
| 12 | PI-PS-PDMS 1K-6K-1K | 5% | No dissolution | 175° C./2 hours |
| 2 | PE-PS-PDMS 3K-0.5K-5K | 5% | Soluble; large viscosity increase | 175° C./2 hours |
| 13 | PE-EP-PDMS-PDPS 3K-0.5K-5K-0.6K | 5% | Gel-no gravity flow | 175° C./2 hours |
| 14 | PVCH + PE-EP-PDMS (1) | 10% (50/50) | Gel-no gravity flow | 175° C./2 hours |

* T = temperature; t = time

I claim:

1. A silicone oil gel composition which is comprised of a polysiloxane block copolymer which has at least two blocks of polystyrene, polyethylene, and hydrogenated polyisoprene wherein the overall number average molecular weight is from 1000 to 50,000, the polystyrene content is 15% or less by weight, the polystyrene block weight average molecular weight is from 0 to 10,000, the polyethylene block number average molecular weight is from 0 to 10,000, the hydrogenated polyisoprene block number average molecular weight is from 0 to 10,000, the polysiloxane block number average molecular weight is from 1000 to 49,000, wherein the block copolymer is dissolved in a hydrogenated aromatic group-containing silicone oil.

2. The composition of claim 1 wherein the overall molecular weight is 1000 to 25,000 and the polystyrene content is 10% or less.

3. The composition of claim 2 wherein the polysiloxane is polydimethylsiloxane and the block molecular weight is 1000 to 25,000.

4. The composition of claim 3 wherein the polyethylene block molecular weight is 0 to 5000.

5. The composition of claim 3 wherein the polystyrene block molecular weight is 0 to 5000.

6. The composition of claim 3 wherein the hydrogenated polyisoprene block molecular weight is 0 to 5000.

7. The composition of claim 1 wherein the aromatic group-containing silicone oil is a random copolymer of polydimethylsiloxane and polymethylphenylsiloxane.

8. The composition of claim 7 wherein the polydimethylsiloxane content is greater than 50%.

9. A process for the hydrogenation of aromatic group-containing silicone oils which comprises subjecting them to hydrogen at 125 to 200° C. and a hydrogen pressure of 1000 to 1700 psi for 30 minutes to 5 hours in the presence of a nickel octanoate/aluminum triethyl catalyst having Al:Ni ratio of 1:1 to 5:1.

* * * * *